E. A. FORD.
POWER TRANSMITTER.
APPLICATION FILED MAR. 25, 1914.

1,190,139.

Patented July 4, 1916.
3 SHEETS—SHEET 1.

Witnesses
Floyd R. Cornwall
Francis P. _____

Inventor
E. A. Ford.
By _____ Attorney.

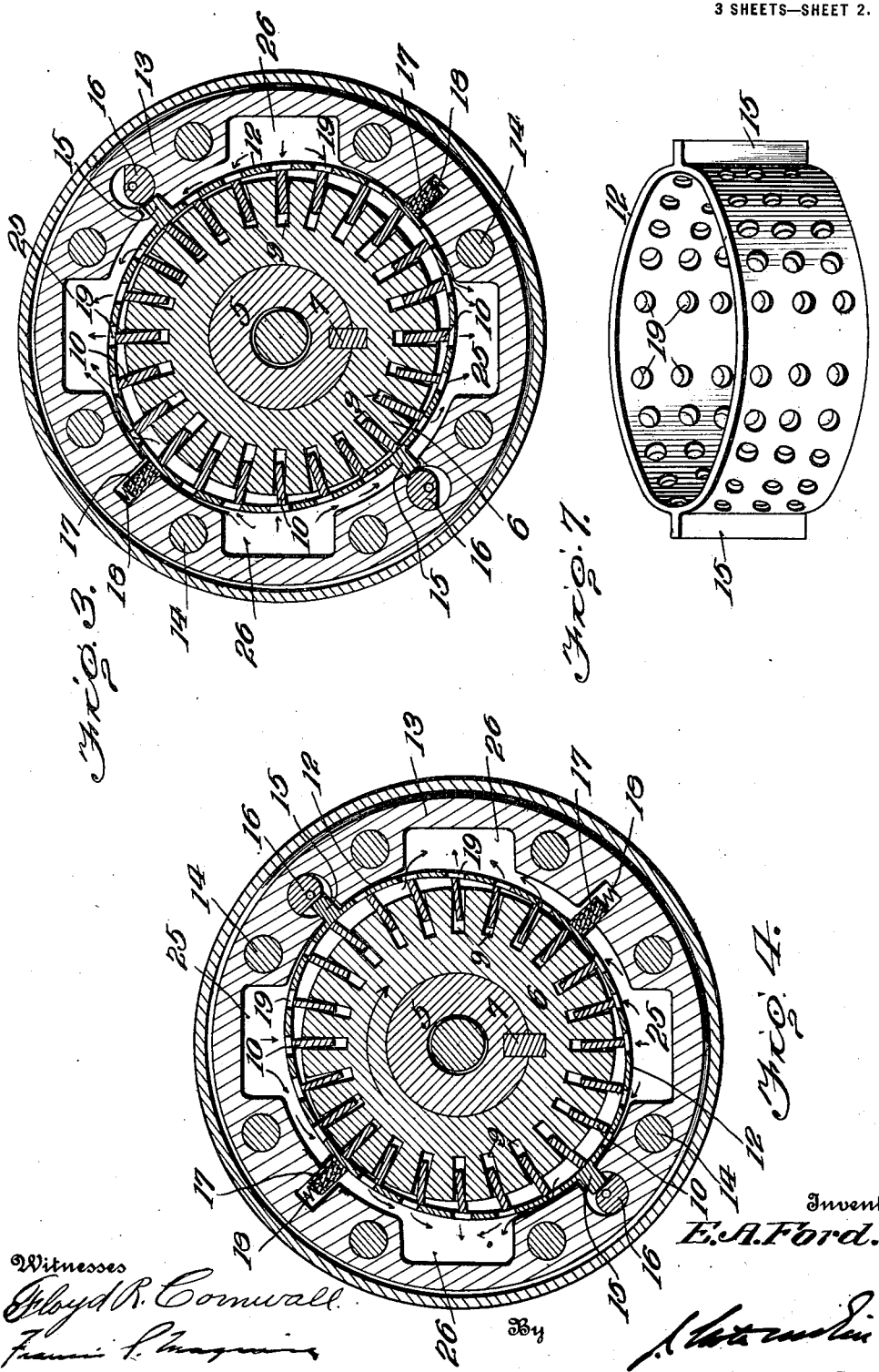

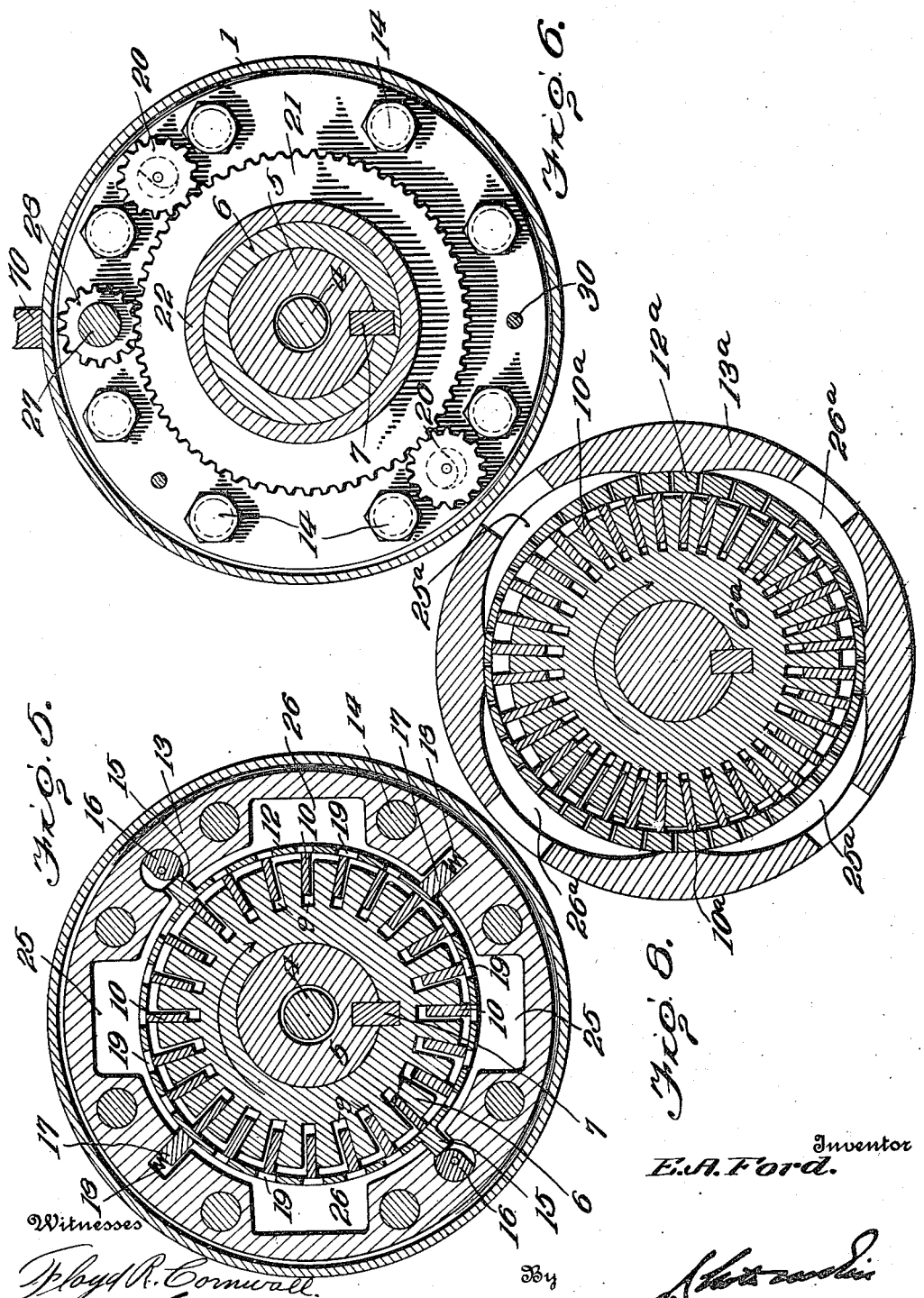

UNITED STATES PATENT OFFICE.

EUGENE A. FORD, OF UXBRIDGE, MASSACHUSETTS.

POWER-TRANSMITTER.

1,190,139.   Specification of Letters Patent.   Patented July 4, 1916.

Application filed March 25, 1914. Serial No. 827,189.

*To all whom it may concern:*

Be it known that I, EUGENE A. FORD, of Uxbridge, in the county of Worcester and State of Massachusetts, have invented certain new and useful Improvements in Power-Transmitters; and I do hereby declare the following to be a full, clear, and exact description of the invention, such as will enable others skilled in the art to which it appertains to make and use the same.

The primary object of this invention is to provide a power transmitter, especially adapted for motor vehicles, which will be compact and simple, and also positive in operation.

A further object is to provide in a power transmitter a pump or motor which will be dynamically balanced, and one which will automatically prevent abnormal pressure within the system. And a further object is to provide means for automatically expelling air from the system, and likewise means for automatically replenishing liquid lost by leakage.

Figure 1:
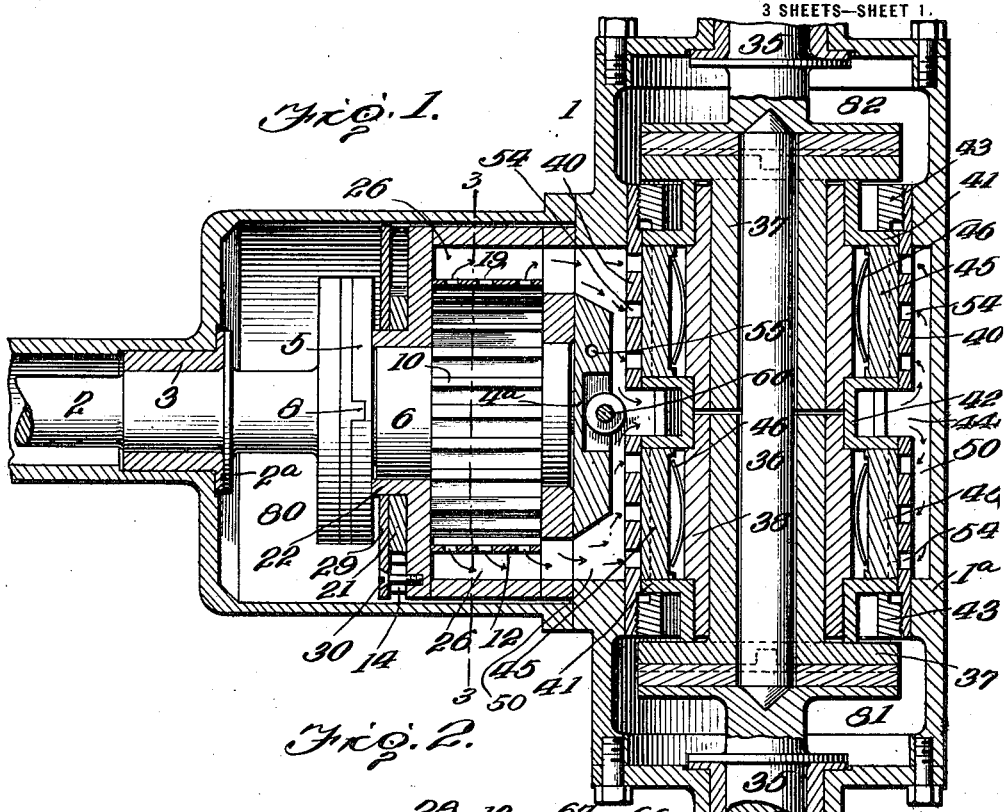
Figure 2:
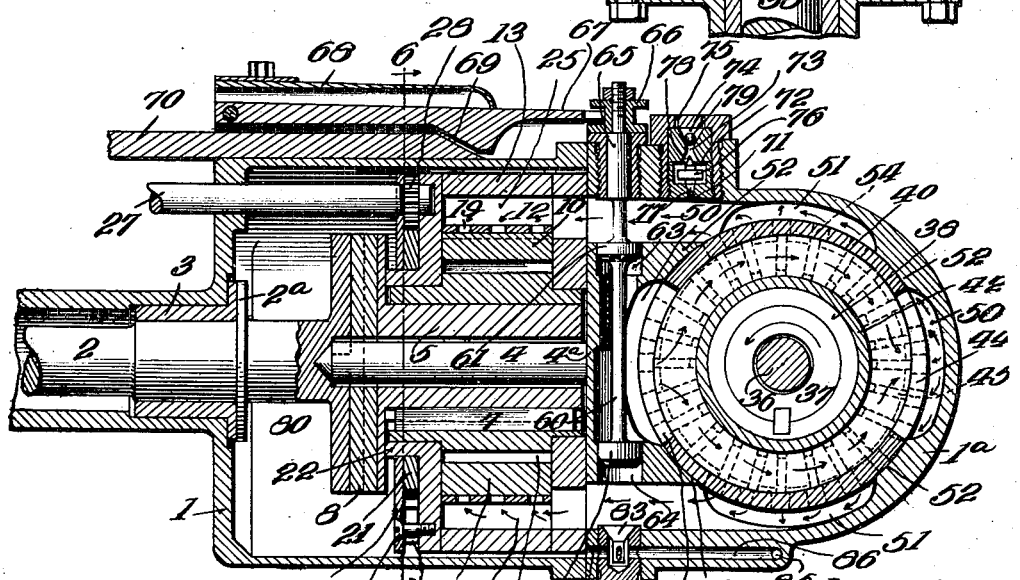

In the accompanying drawings, Figure 1 is a horizontal sectional view showing my improvements as applied for use in a motor vehicle. Fig. 2 is a vertical sectional view at right-angles to Fig. 1. Fig. 3 is a transverse section on line 3—3, Fig. 1. Fig. 4 is a similar view showing the direction of flow of the liquid reversed from that shown in Fig. 3. Fig. 5 is also a view on line 3—3, Fig. 1, but with the parts in their neutral positions. Fig. 6 is a section on line 6—6, Fig. 2. Fig. 7 is a perspective view of the fluid controlling member. Fig. 8 shows a modification.

Referring to the drawings, 1 designates a casing, the parts of which are suitably bolted together, the adjoining surfaces of such parts being accurately fitted so that the casing will be liquid-tight, and within this casing I locate the power transmitting system which is shown, by way of illustration, as comprising a variable speed and reversible pump and two non-changeable motors, but it is within the scope of my invention to adapt my improvements in such manner that the motors may be rendered changeable and the pump non-changeable. I shall, however, describe the invention in connection with a pump which is capable of varying the flow of a body of liquid and changing the direction of such flow in connection with non-changeable motors.

2 designates the shaft of an engine, or other prime motor, journaled in a bushing 3 in one end of casing 1, and said shaft has a flange 2ª which bears against the bushing to take the end thrust of the shaft in one direction, while the thrust in the opposite direction is taken by a thrust-rod 4, one end of which bears against shaft 2, and the other end against a wall 4ª within the casing. 5 is a shaft having a sliding fit in pump piston 6, but prevented from turning in the latter by a key 7. The two shafts, 2 and 5, are shown as joined by the well-known Oldham coupling 8 which is flexible for small variations from alinement of the coupled shafts. The rotary pump piston 6 is provided in its periphery with radial slots 9 wherein fit blades 10 which are capable of moving inwardly and outwardly in said slots, but are normally held outwardly, when the piston is rotated, by centrifugal action.

12 designates a fluid controlling member which is shown in the form of a sleeve surrounding the piston and its blades and having a loose fit within the bore of the piston casing 13. The parts of this latter casing are accurately fitted so as to be liquid-tight and are securely bolted together and to wall 4ª of the system-casing 1 by bolts 14, Fig. 6. This sleeve 12 is shown as provided with diametrically opposite lugs 15 which preferably extend the full length of the sleeve and are adapted to fit loosely in longitudinal slots in the piston casing 13, and at their outer ends these lugs engage with cams 16. This sleeve is preferably made of steel and is spring-tempered, but before tempering is given an elliptical formation with the long diameter through the lugs 15 so that the latter will be held against cams 16 by the inherent tension of the tempered steel. The natural position of sleeve 12 is indicated in Fig. 4, with the lugs 15 against the flat faces of the cams. At diametrically opposite points, and at right-angles to the lugs 15, the sleeve 12 is engaged by two packing strips 17 which are held by means of springs 18 against the outer surface of the sleeve. These packing strips 17 and the radially movable blades 10 correspond in length to the length of sleeve 12 and are designed to fit at their ends against the walls of the piston casing 13. While they have a free working fit within such casing they are practically liquid-proof, and with the lugs form stops which prevent the free flow of the liquid around the periphery of the sleeve. The latter is formed with a number of radial perforations 19 suitably spaced apart, and preferably arranged in rows, but the nearest angular distance between the perforations on opposite sides of either of the lugs 15 or the packing strips 17 must be greater than the greatest angular distance between any two adjoining blades 10 so that there will always be at least one blade to act as a valve to prevent the flow of more liquid than is carried between the blades from one side of a lug 15 or a strip 17 to the other side thereof. The liquid is designed to have ingress and egress through the perforations 19 into and out of the spaces between the sleeve and the piston.

The means for operating the cams may be widely varied. I have shown the shafts of such cams mounted in the end members of the piston casing so as to have a free rotary movement and yet to be practically leak-proof, and at one end each cam carries a pinion 20, and these pinions engage the gear 21 (Fig. 6) which is mounted on boss 22 turned on a projection of one of the end plates of the piston casing. In assembling the parts the cams 16 are positioned as shown in Fig. 4, and the gear 21 is then put in place. In this position the cams are the greatest possible distance from the axis of the pump piston, and the controlling sleeve 12 has an elliptical shape with the long diameter through the lugs 15 and the short diameter through the spring-pressed strips 17, and if the piston 6 is rotated clockwise, as shown by the arrow in Fig. 4, the liquid will be forced outwardly from the piston at diametrically opposite points and taken into the piston at diametrically opposite points at right-angles to the points of outlet.

As shown in Figs. 3, 4 and 5 the pump piston casing is provided with four passages or conduits extending longitudinally thereof and arranged in pairs at right-angles to each other, corresponding passages being diametrally opposed. When the parts are in the position shown in Figs. 2 and 4 the flow of the body of liquid to the piston will be through the opposite passages 25 while the discharge will be through the opposed passages 26 (Fig. 1) at right-angles to the passages 25. Direct communication between the inlet and outlet passages outside of the controlling sleeve is prevented by the spring-pressed strips 17 and the lugs 15.

If the gear 21 be turned counter-clockwise, and the lugs 15 of the controlling sleeve be forced inwardly toward the axis of the piston by the rotation of cams 16, and the intermediate opposite portions of the sleeve forced away from the axis of the piston, the long and short diameters of the ellipse will approach equality and the sleeve be caused to assume a substantially cylindrical formation, as shown in Fig. 5, with the result that no pumping action will be produced by the rotation of the pump piston, the liquid merely revolving between the blades with the piston without producing pressure. If the gear 21 be turned still farther in the same direction, the controlling sleeve will assume the position shown in Fig. 3, wherein the short diameter of the ellipse is through the lugs 15, while the long diameter is through the spring-pressed strips 17. When in this position, with the pump piston still revolving clockwise, the direction of the flow of the liquid under pressure will be the reverse of that which obtains when the parts are in the position shown in Fig. 4, that is to say, the liquid will be discharged into passages 25 and taken into the pump through passages 26. In all positions of the controlling sleeve, the amount of the liquid pumped varies with the difference between the long and short diameters thereof. Hence it follows that this controller may be positioned so that any quantity of liquid may be pumped per each revolution of the piston, ranging from the maximum capacity in one direction to zero, and from zero to the maximum capacity in the opposite direction. It will also be noted that these changes may be produced by merely operating the gear 21. The means employed for this latter purpose may be widely varied. I have shown a manually operable shaft 27 having a pinion 28 engaging gear 21. According to the means shown, the latter gear 21, the shafts of cams 16 and the pinions 20, together with the pinion 28, are held in place by a plate 29 which is fastened to the pump casing by screws 30, Fig. 2. This plate is omitted from Fig. 6.

35 designates two driven shafts at right-angles to the engine-shaft 2, and to which the driving wheels of a motor vehicle are designed to be secured. These shafts are provided with flanges to hold against outward thrust, and the inward thrust is taken by a thrust-rod 36, Figs. 1 and 2. To each shaft 35 is coupled, preferably by means of an Oldham coupling, a tubular shaft 37 to each of which is keyed a motor piston 38. There is no mechanical connection between the two motors, and as each drives a wheel of the vehicle either may turn faster than the other, as when the vehicle is moving on a curve.

The motor casing is composed of a cylinder 40, two end plates 41, and an intermediate plate 42, and such casing is fitted within the bore of the lateral portion 1ª of casing 1. The bore of cylinder 40 is elliptical, and the end plates 41, and the intermediate plate 42 fit in such bore, and said end plates are held in place by two nuts 43. The intermediate plate 42 has a circumferential groove through which the section Fig. 2 is taken, and the cylinder 40 has two diametrally opposite ports 44 (Fig. 2) in the same plane as and on opposite sides of the groove of the intermediate plate so that the flowing liquid will have free passage through ports 44 and the coincident groove from one side of the motor cylinder to the opposite side, as indicated by arrows in Figs. 1 and 2.

Between the end plates 41 and the intermediate plate 42 are located the motor pistons 38 which are provided with radial slots intersecting their peripheries, and in which slots are located blades 45 which are normally held outwardly against the bore of cylinder 40 by springs 46.

The bore of casing 1ª has two longitudinal passages 50 which are of sufficient length to extend to the outer ends of the motor pistons 38, and the ports 44 open into these passages at the center thereof. At right-angles to the two passages 50, and extending longitudinally of casing 1ª, are two additional diametrally opposed passages 51. These two sets of passages 50 and 51 are preferably formed by grooves in the casing 1ª, and in cutting these four grooves four longitudinal ribs 52 are formed intermediate the grooves, and such ribs extend along the bore of the casing, and as the motor cylinder 40 tightly fits the bore the ribs 52 act as stops to prevent leakage of the liquid from one passage to another around the outside of the cylinder. The latter is placed in casing 1ª so that the long and short diameters of the elliptical bore thereof will pass, respectively, through the centers of opposed ribs 52. This cylinder 40 has a number of radial perforations 54 leading from the several passages to the spaces between the pistons and the elliptical bore of the piston cylinder. The angular distance between the perforations leading to one passage and the perforations leading to an adjoining passage must be greater than the angular distance between any two adjoining piston blades 45.

Into the ends of the inner passage 50 of the motor casing open the passages 26 of the pump casing (Fig. 1) while the passages 51 in the top and bottom of the motor casing communicate with passages 25 of the pump casing (Fig. 2). In other words, the passages 26 lead from two diametrally opposite sides of the pump to two diametrally opposite sides of the two motors, the inner passage 50 communicating through ports 44 and the circumferential groove of plate 42 with the outer passage 50, and the passages 25 connect the other two sides of the pump to the other two sides of each of the motors. In the partition 4ª of the motor casing I preferably form a conduit 55 (Fig. 1) to insure equal pressure in the two opposite passages 25.

Since in the normal operation there are two eduction passages diametrally opposite each other and two induction passages diametrally opposite each other, in both the pump and the two motors, the pressures from the liquid will be balanced and there will be no side thrust upon the journals of the pistons. The arrows in the passages, Figs. 1 and 2, indicate the direction of the flow of the liquid when the controller of the pump is in the position shown in Fig. 4, with the pump revolving clockwise. To reverse the direction of rotation of the motors it is necessary to shift the ellipse of the controller, but without changing the rotation of the pump.

When abnormal pressure is exerted in either set of passages, 25 or 26, by-passes are opened to form direct communications between the two sets of passages. Any suitable means may be employed for this purpose. I have shown (Fig. 2) a plunger 60 carrying two piston valves 61 and 62 adapted to control by-passes 63 and 64 in the casing partition 4ª. The plunger has a stem 65 which fits freely in a hole through the motor casing, preferably at the top thereof, and upon such stem is a grooved nut 66 with which engages one end of a lever 67 against which bears a spring 68 with a predetermined tension to hold the valves 61 and 62 against whatever pressure desired. The cross-sectional area of valve 61 is greater than the cross-sectional area of valve 62, and consequently when pressure is exerted on the liquid in passage 26 the greater force will be applied to the plunger in the direction of valve 61, and the plunger will have a tendency to move under such pressure, but the tension of spring 68 opposes such movement and the plunger will be held in place until the resultant of the forces on the two valves 61 and 62 is greater than the opposing force of the spring. When this occurs the plunger will move upward and the valve will open the by-passes between the two series of passages and any further increase of pressure in passages 26 is prevented. The sum of the cross-sectional areas of valve 62 and valve stem 65 is greater than the cross-sectional area of valve 61, and consequently when pressure is exerted on the liquid in passages 25 the resultant of the forces on the valves and stem of plunger 60 will also be in the direction opposed by the tension of spring 68, with the same result as when the pressure is on the liquid in the passages 26.

The lever 67 is provided with an inclined shoulder 69 with which is designed to engage the wedge-shaped end of a push-rod 70. When the latter is forced against the shoulder 69 the lever is shifted, as against the tension of spring 68, and the by-passes are opened, allowing the pump to operate without communicating any pressure to the motors. This push-rod may be operated manually, and it follows that according to the means shown and described the opening up of the by-passes may be effected manually as well as automatically.

For the purpose of automatically expelling air from the power transmitting system a small outlet port 71 leading from the upper passage 25 is made at or near the highest point of the inclosing casing and such outlet leads to a chamber 72 which is connected by a passage 73 to a second chamber 74 having escape openings 75. Within chamber 72 is a float 76 which carries valve 77 for closing port 71 and a valve 78 for closing passage 73. Assuming that the vehicle is being propelled forwardly and the pressure on the liquid is in passages 26 and there is a slight suction in passages 25, by the action of gravity valve 77 will close outlet port 71, and a ball valve 79 will close passage 73 and air will be prevented from entering the system. Assuming that there is some air in the system, when the direction of the movement of the vehicle is reversed, the pressure on the liquid will be in passages 25 and the air above the liquid being compressed will lift valve 77 from its seat and flow through port 71, around the float 76 and through outlet 75 to the atmosphere until all the air has been expelled. Any transmitting liquid entering chamber 72 by acting on the float 76 will cause valve 78 to close passageway 73, and thus loss of liquid is prevented. The ball valve 79 serves to prevent foreign matter entering chamber 72.

80, 81 and 82 are spaces within the inclosing casing which are utilized as reservoirs for an extra supply of liquid. They are located at the outer ends of the pump and motors and thus serve to prevent the loss of liquid from the system. A valve 83 controls the supply of liquid from the reservoirs to the system. It is normally free to open, but is held closed when the vehicle is reversing and the pressure on the liquid is in passages 25. A small passage 84 leading from reservoir 80 communicates with a conduit 85 between the two reservoirs 81 and 82, such communication being formed through a passage 86. The two passages 84 and 86 open into the port controlled by valve 83. When the vehicle is backing, if any air is in the power transmitting system, the expulsion thereof at the top of the casing will result in the formation of a vacuum, but the liquid will not flow from the reservoirs until the pressure in passages 25 is relieved by stopping the backward travel. As the vehicle moves forward the suction in passages 25 will cause the unseating of valve 83 and liquid from the reservoirs will be supplied to restore the necessary amount of liquid in the system.

The advantages of my invention will readily be appreciated by those skilled in the art. It will be observed that by simply changing the controller, that is to say, reversing the relative positions of the long and short diameters of the elliptical sleeve the direction of flow of the liquid is changed, and hence without altering the direction of rotation of the pump the rotation of the motors may be reversed. Likewise, through the instrumentality of this single controller I am enabled to vary the speed. By reason of the opposed induction and eduction passages the system is uniformly balanced.

While I have shown and described the preferred means for carrying out my invention, yet I do not restrict myself thereto, since changes may be made in the construction and operation of the parts without departing from my invention as defined by my claims; and likewise, as before suggested, the end sought by me may be obtained by constructing the motor or motors after the manner herein described in reference to the pump.

While I prefer to make the controller in the form of a flexible sleeve, the contour of which may readily be changed as conditions may require, yet the same results may be secured by forming the controller of non-flexible material. Thus, in Fig. 8 I have shown the controller 12$^a$ as having an outer circular surface which fits closely but freely in the inclosing casing 13$^a$. The bore of the controller is in the form of an ellipse. The inner surface of casing 13$^a$ is grooved or cut away to form opposed passages 25$^a$ and opposed passages 26$^a$ arranged in pairs. These passages are 90° apart, leaving corresponding bearing points between adjacent passages and against which the controller sleeve is designed to bear, said bearing point forming liquid stops. The angular length of each bearing point must be at least as great as the angular distance apart of any two adjoining blades 10$^a$ of the rotary piston 6$^a$ so that there will at any period be at least one blade to function as a valve between adjacent passages. If the piston is revolved in the direction shown by the arrow, and the controller sleeve is in the position shown, the fluid will be forced out of the sleeve through the perforation thereof into passages 25ª and drawn in through passages 26ª. If the position of the sleeve be changed by an axial turning of 45° then the same quantity of fluid will be forced into and received from the several passages, and the pump will be in a neutral position. If the controlling sleeve is still further turned until it has made one-quarter of a revolution in respect to its initial position, then the direction of the flow will be reversed, the outlet being through passages 26ª and the inlet through passages 25ª. If the sleeve be turned only a small angle from the position shown in Fig. 8, in the direction of the neutral position, a small amount of the fluid will be taken from passages 25ª and a relatively large amount forced into them, leaving a net amount less than the maximum to be forced through the passages 25ª, and this net amount will decrease as the neutral position is approached. I have not shown in Fig. 8 means for manipulating the controlling sleeve, as it is obvious that any suitable means may be employed for this purpose. It will be understood also that while the modification shown in Fig. 8 is described in connection with a pump such construction may be observed in respect to the motors.

I claim as my invention:

1. A power transmitter comprising a rotary pump or motor, two diametrally opposite induction passages, two diametrally opposite eduction passages, and means for varying the quantity and the direction of the flow of liquid passing through the apparatus in each revolution of the pump or motor without changing the direction of rotation of the pump or motor.

2. A power transmitter comprising a rotary pump or motor, having radially-movable blades, two diametrally opposite induction passages, two diametrally opposite eduction passages, and means controlling said blades for varying the quantity and the direction of the flow of liquid passing through the apparatus in each revolution of the pump or motor without changing the direction of rotation of the pump or motor.

3. A power transmitter comprising a rotary pump or motor having radially-movable blades, a casing therefor having diametrally opposite induction passages and diametrally opposite eduction passages, and a controller sleeve between said casing and said blades and with which the latter are designed to engage, said sleeve having openings for the passage of liquid and constructed and arranged for varying the quantity and the direction of the flow of liquid passing through the apparatus in the revolution of the pump or motor without changing the direction of rotation of the pump or motor.

4. A power transmitter comprising a rotary pump or motor having radially-movable blades, a casing therefor having diametrally opposite induction passages and diametrally opposite eduction passages, and a controller sleeve between said casing and said blades and with which the latter are designed to engage, said sleeve having openings for the passage of liquid and constructed and arranged for varying the quantity and the direction of the flow of liquid passing through the apparatus in the revolution of the pump or motor.

5. A power transmitter comprising a rotary pump or motor having radially-movable blades, a casing therefor having diametrally opposite induction passages and diametrally opposite eduction passages, a controller sleeve between said casing and said blades and with which the latter are designed to engage, said sleeve having openings for the passage of liquid, and also having an elliptical bore, and means for varying the position of the sleeve relatively to the blades to vary the quantity and the direction of the flow of liquid passing through the apparatus.

6. A power transmitter comprising a rotary pump or motor having radially-movable blades, a casing therefor having diametrally opposite induction passages and diametrally opposite eduction passages, a controller sleeve between said casing and said blades and with which the latter are designed to engage, said sleeve having openings for the passage of liquid and also having an elliptical bore, and means for changing the diametral relation of the sleeve to the blades.

7. A power transmitter comprising a rotary pump or motor having radially-movable blades, a casing therefor having diametrally opposite induction passages, a controller sleeve between said casing and said blades and with which the latter are designed to engage, said sleeve having openings for the passage of liquid and composed of yielding material, and means for imparting a variable shape to said sleeve relatively to the blades.

8. A power transmitter comprising a rotary pump or motor having radially-movable blades, a casing therefor having diametrally opposite induction passages and diametrally opposite eduction passages, a controller sleeve between said casing and said blades and with which the latter are designed to engage, said sleeve having openings for the passage of liquid and composed of yielding material, and means for imparting an elliptical shape to said sleeve relatively to the blades.

9. A power transmitter comprising a rotary pump or motor having radially-movable blades, a casing therefor having diametrally opposite induction passages and diametrally opposite eduction passages, a controller sleeve between said casing and said blades and with which the latter are designed to engage, said sleeve having openings for the passage of liquid and composed of yielding material, and means for imparting a variable elliptical shape to said sleeve relatively to the blades.

10. A power transmitter comprising a rotary pump or motor having radially-movable blades, a casing therefor having induction and eduction passages, and a controller sleeve between said casing and said blades and with which the latter are designed to engage, said sleeve having openings for the passage of liquid and also having an elliptical bore, and means for varying the position of the sleeve relatively to the blades.

11. A power transmitter comprising a rotary pump or motor having radially-movable blades, a casing therefor having induction and eduction passages, a controller sleeve between said casing and said blades and with which the latter are designed to engage, said sleeve having openings for the passage of liquid and composed of yielding material, and means for imparting a variable shape to said sleeve relatively to the blades.

12. A power transmitter comprising a rotary pump or motor having radially-movable blades, a casing therefor having induction and eduction passages, a controller sleeve between said casing and said blades and with which the latter are designed to engage, said sleeve having openings for the passage of liquid and composed of yielding material, and means for imparting an elliptical shape to said sleeve relatively to the blades.

13. A power transmitter comprising a rotary pump or motor having radially-movable blades, a casing therefor having induction and eduction passages, a controller sleeve between said casing and said blades and with which the latter are designed to engage, said sleeve having openings for the passage of liquid and composed of yielding material, and means for imparting a variable elliptical shape to said sleeve relatively to the blades.

14. A power transmitter comprising a rotary pump or motor having radially-movable blades, a casing therefor having induction and eduction passages, a controller sleeve between said casing and said blades, said sleeve having spaced-apart openings extending lengthwise thereof and constructed and arranged for varying the quantity and the direction of the flow of liquid passing through the apparatus in the revolution of the pump or motor, and means between the sleeve and the casing for preventing the flow of liquid from the induction to the eduction passage on the outside of the sleeve, the nearest angular distance between the openings in the sleeve on opposite sides of said means being greater than the greatest angular distance between adjoining blades.

15. The combination with a casing having two diametrally opposite induction passages and two diametrally opposite eduction passages, of a rotary piston having radially-movable blades, a sleeve between said casing and said blades, said sleeve having openings and formed of yielding material, lugs forming stops at diametrally opposite points between the sleeve and the casing, means engaging the lugs for varying the position of the sleeve diametrally relatively to the blades, and diametrally opposite yielding stops also interposed between the sleeve and the casing at right-angles to the said lugs.

16. The combination with a casing having two diametrally opposite induction passages and two diametrally opposite eduction passages, of a rotary piston having radially-movable blades, a sleeve between said casing and said blades, said sleeve having openings and formed of yielding material, lugs forming stops at diametrally opposite points between the sleeve and the casing, cams engaging the lugs for varying the position of the sleeve diametrally relatively to the blades, means for rotating said cams, and diametrally opposite yielding stops also interposed between the sleeve and the casing at right-angles to said lugs.

17. A power transmitter comprising a rotary pump, a motor, two diametrally opposite induction passages leading to diametrally opposite sides of the motor and the pump, two diametrally opposite eduction passages leading from the pump to opposite sides of the motor, and means for varying the quantity and the direction of the flow of liquid passing through the apparatus in each revolution of the pump or motor without changing the direction of rotation thereof.

18. A power transmitter comprising a rotary pump having radially-movable blades, a motor, two induction passages on diametrally opposite sides of the pump and motor, two eduction passages also on diametrally opposite sides of the pump and motor, and means controlling said blades for varying the quantity and the direction of the flow of liquid passing through the apparatus in each revolution of the pump or motor without changing the direction of rotation thereof.

19. A power-transmitter comprising a rotary pump, a motor, two induction passages on diametrally opposite sides of the pump communicating with diametrally opposite sides of the motor, two eduction passages also on diametrally opposite sides of the pump communicating with diametrally opposite sides of the motor, a by-pass common to the induction and eduction passages, and valve-mechanism for normally closing such by-pass and constructed and arranged to be unseated by excess pressure in either set of passages.

20. A power-transmitter comprising a rotary pump, a motor, two induction passages on diametrally opposite sides of the pump communicating with diametrally opposite sides of the motor, two eduction passages also on diametrally opposite sides of the pump communicating with diametrally opposite sides of the motor, a by-pass common to the induction and eduction passages, valve-mechanism for normally closing such by-pass and constructed and arranged so as to be unseated by excess pressure in either set of passages, and manually operable means for controlling said valve-mechanism.

21. A power transmitter comprising a casing having diametrally opposed induction and eduction passages arranged in pairs, a cylinder fitted in said casing and having a central dividing plate formed with a circumferential passageway and opening at diametrally opposite points into two of said passages, pistons in said cylinder on opposite sides of said dividing plate having radially-movable blades, and a rotary pump having diametrally opposite induction and eduction passages arranged in pairs and communicating with the first mentioned passages.

22. A power-transmitter comprising a fluid-tight casing, a rotary pump, a fluid-tight casing therefor within the first mentioned casing, a motor, a fluid-tight casing for the latter also within the first mentioned casing, induction and eduction passages connecting the pump and the motor, means encircling said pump for changing the direction of the flow of liquid without changing the direction of rotation of the pump, said first mentioned casing having oil reservoirs, passages connecting said reservoirs with the motor and the normal induction passages of the pump, and a valve designed to be automatically unseated for supplying oil from the reservoir to the pump and motor casing, said valve being unseated by the flow of the liquid through the normal induction passages and seated when the direction of the flow of the liquid is reversed.

23. A power-transmitter comprising a fluid-tight casing, a rotary pump, a fluid-tight casing therefor within the first mentioned casing, a motor, a fluid-tight casing for the latter also within the first mentioned casing, induction and eduction passages connecting the pump and the motor, means for changing the direction of the flow of the liquid without changing the direction of rotation of the pump, said first mentioned casing having oil reservoirs, passages connecting said reservoirs with the motor and the normal induction passages of the pump, a valve designed to be automatically unseated for supplying oil from the reservoir to the pump and motor casing, said valve being unseated by the flow of the liquid through the normal induction passages and seated when the direction of the flow of the liquid is reversed, and an air-escape valve in the top of said first mentioned casing, said air-escape-valve being unseated when the direction of the flow of the liquid is reversed.

24. A power transmitter comprising a casing composed of a series of parts united together, a rotary shaft, a piston carried by such shaft having a central bore, and a thrust rod extending through such bore from said shaft to the opposite end of said casing.

25. A power transmitter comprising a casing, a rotary pump located in said casing, driven shafts arranged end to end at right-angles to the pump, motors mounted on said driven shafts and designed to be actuated by said pump, said motors having coinciding central bores, and a thrust rod extending through said bores and engaging the opposed ends of said driven shafts.

In testimony whereof, I have signed this specification in the presence of two subscribing witnesses.

EUGENE A. FORD.

Witnesses:
 WILLIAM O. SIMS,
 FRED A. STORY.